US006968315B1

(12) United States Patent
Nakisa

(10) Patent No.: US 6,968,315 B1
(45) Date of Patent: Nov. 22, 2005

(54) METHOD AND APPARATUS FOR ADVERTISING OVER A COMMUNICATIONS NETWORK

(75) Inventor: Ramin C. Nakisa, Little Chalfont (GB)

(73) Assignee: NCR Corporation, Dayton, OH (US)

(*) Notice: Subject to any disclaimer, the term of this patent is extended or adjusted under 35 U.S.C. 154(b) by 0 days.

(21) Appl. No.: 09/495,759

(22) Filed: Feb. 1, 2000

(30) Foreign Application Priority Data

Feb. 5, 1999 (GB) .................................. 9902480

(51) Int. Cl.[7] .......................................... G06T 15/00
(52) U.S. Cl. ........................... 705/27; 705/14; 705/26; 345/419; 434/81
(58) Field of Search ............................. 705/7, 14, 10, 705/26, 27; 345/41.9, 706; 434/81, 82

(56) References Cited

U.S. PATENT DOCUMENTS

| 5,524,195 | A | * | 6/1996 | Clanton, III et al. ......... 725/81 |
| 5,704,017 | A | | 12/1997 | Heckerman et al. |
| 5,950,172 | A | * | 9/1999 | Klingman ..................... 705/26 |
| 6,106,299 | A | * | 8/2000 | Ackermann et al. .......... 434/81 |
| 6,236,975 | B1 | * | 5/2001 | Boe et al. ...................... 705/7 |
| 6,327,574 | B1 | * | 12/2001 | Kramer et al. ................ 705/14 |
| 6,329,986 | B1 | * | 12/2001 | Cheng ......................... 345/419 |
| 6,430,539 | B1 | * | 8/2002 | Lazarus et al. ............... 705/10 |

FOREIGN PATENT DOCUMENTS

| EP | 0751471 | 1/1997 | |
| EP | 0902383 | 3/1999 | |
| WO | 9815904 | 4/1998 | |
| WO | WO 01/13361 A1 | * 2/2001 | ........... G10L 15/10 |

* cited by examiner

Primary Examiner—John Leonard Young
(74) Attorney, Agent, or Firm—Gregory A. Welte

(57) ABSTRACT

The present invention relates to advertising over a communications network comprising a plurality of interactive client subscriber sites interconnected with an advertising information server site. The attributes of a plurality of customers are stored in the form of customer attribute vectors $c_k$. The attributes of one or more role models are stored in the form of one or more role model attribute vectors $i_j$. A marketing function M is defined which maps the customer attribute vectors to the one or more role model attribute vectors such that $i_j = M(c_k)$. At the interface advertising information server site interactive advertising displays are provided incorporating the one or more role models. An interactive communication link is established from the customer subscriber sites to the advertising information server site enabling customers to access the displays and to make purchases in response to the displays. The marketing function M is updated in dependence upon the customer purchases.

13 Claims, 9 Drawing Sheets

|     | $i_0$ | $i_1$ | $i_2$ | $i_3$ | · · · · · · · · | $i_M$ |
|-----|-------|-------|-------|-------|-----------------|-------|
| $c_0$ | 1 | 0 | 1 | 0 | · · · · · · · · | 1 |
| $c_1$ | 0 | 0 | 1 | 0 | · · · · · · · · | 0 |
| $c_2$ | 0 | 1 | 0 | 1 | · · · · · · · · | 0 |
| $c_3$ | 1 | 0 | 0 | 0 | · · · · · · · · | 0 |
| ⋮ |   |   |   |   |   |   |
| $c_N$ | 1 | 0 | 0 | 0 | · · · · · · · · | 1 |

US 6,968,315 B1

METHOD AND APPARATUS FOR ADVERTISING OVER A COMMUNICATIONS NETWORK

BACKGROUND OF THE INVENTION

The present invention relates to advertising over a communications network comprising a plurality of interactive client subscriber sites interconnected with an advertising information server site.

It has already been proposed in our co-pending European patent application No (98306734.9) to provide a computer network such as the Internet to provide advertisements for products and services. The Internet commonly uses a client-server based information service presentation system known as the "World Wide Web" (WWW) also referred to as The Web. In The Web, a server station or "site" may provide a series of screens or "pages" of information which a client or customer can access in sequence by sending appropriate request signals over the Internet. The Web has a standard protocol for information transfers known as the HyperText Transfer Protocol (HTTP) and request signals from a client and data signals from a server are in a format known as HyperText Mark-up Language(HTML).

In our above-mentioned co-pending patent application it has been proposed to present advertising information in the form of an interactive display of a role model or virtual idol portrayed in a role as a consumer of goods and services. The role model or virtual idol has affinity characteristics chosen to build up a character profile that combines the most predominant consumer affinity characteristics of a target subscriber group. In addition to a central character profile, further connected character profiles and an environment profile are built up. The aim of building up the character and environment profiles in this way is to ensure that the central character and environment match closely the lifestyle aspirations of the target consumer segment.

Whilst the invention described in our previous co-pending patent application is an effective way of presenting advertising information, the primary benefit of using a role model or virtual idol is that it creates an affinity with a particular consumer segment. However, there is still a need to optimize the affinity of characters to the consumers to which the advertising information is directed.

SUMMARY OF THE INVENTION

It is an aim of the present invention to improve the affinity between characters and consumers having access to advertising displays incorporating the characters.

According to the present invention, there is now provided a method of advertising over a communications network comprising a plurality of interactive customer subscriber sites interconnected with an advertising information server site, the method being characterized by the steps of;

storing the attributes of a plurality of customers in the form of customer attribute vectors $c_k$, storing the attributes of one or more role models in the form of one or more role model attribute vectors $i_j$, defining a marketing function M which maps the customer attribute vectors to the one or more role model attribute vectors such that $i_j = M(c_k)$, providing, at the interface advertising information server site, interactive advertising displays incorporating the one or more role models, establishing an interactive communication link from the customer subscriber sites to the advertising information server site enabling customers to access the displays and to make purchases in response to the displays, and updating the marketing function M in dependence upon the customer purchases.

According to the present invention, there is also provided apparatus for advertising over a communications network comprising a plurality of interactive customer subscriber sites interconnected with an advertising information server site, the apparatus being characterized by;

means for storing the attributes of a plurality of customers in the form of customer attribute vectors $c_k$, means for storing the attributes of one or more role models in the form of one or more role model attribute vectors $i_j$, means for defining a marketing function M which maps the customer attribute vectors to the one or more role model attribute vectors such that $i_j = M(c_k)$, means providing, at the interface advertising information server site, interactive advertising displays incorporating the one or more role models, means for establishing an interactive communication link from the customer subscriber sites to the advertising information server site enabling customers to access the displays and to make purchases in response to the displays, and means for updating the marketing function M in dependence upon the customer purchases.

BRIEF DESCRIPTION OF THE DRAWINGS

The invention will now be further described, by way of example, with reference to the accompanying drawings in which;

FIG. 7 illustrates a subset of data relating attributes of virtual idols to the attributes of client subscribers.

DETAILED DESCRIPTION

Figure 1:
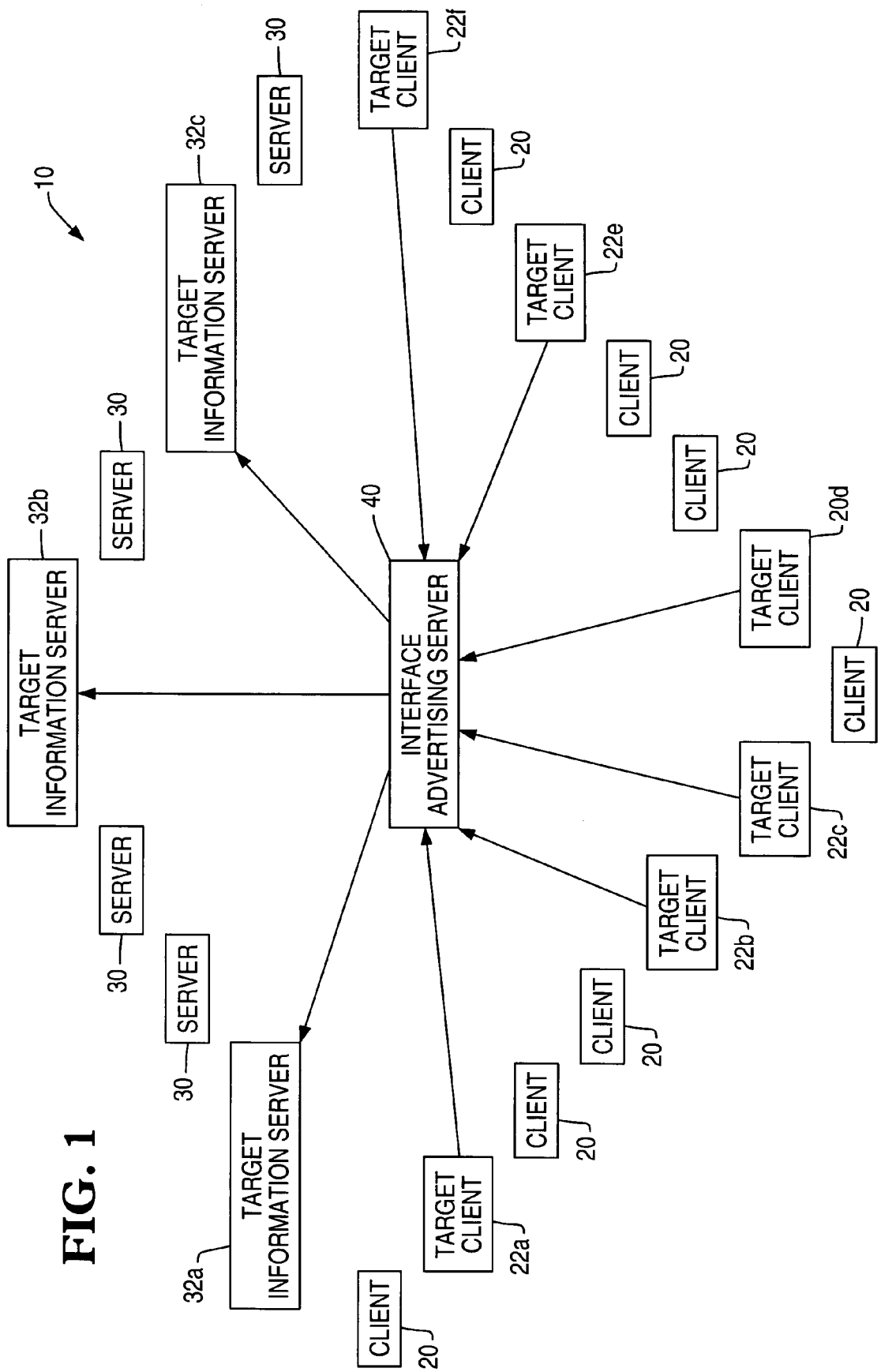
FIG. 1 is a block diagram representing an open communication network embodying the present invention.

Referring to FIG. 1, the communications network 10 includes a plurality of remote client subscriber sites 20, the Internet WWW communication network and a plurality of WWW information sever sites 30. The plurality of client and information server sites include a plurality of target client subscriber sites 22a, 22b, 22c . . . . and target information server sites 32a, 32b, 32c . . . . These target information server sites 32a, 32b, 32c . . . . are Web sites of specific commercial enterprises, the pages of which advertise and provide information about consumer products or services.

These sites 32a, 32b, 32c . . . may also be equipped so as to allow clients which access these pages to conduct transactions; i.e. to order particular products or services and to pay for them over the Web. The target client subscriber sites 22a, 22b, 22c . . . represent the principal consumer segment for the consumer products or services of the target information server sites 32a, 32b, 32c . . . In other words, the target client subscriber sites 22a, 22b, 22c . . . are the consumers or customers to which the commercial enterprises at the target information server sites 32a, 32b, 32c . . . . . . . wish to market and sell their products and services. The communications network 10 also includes an interface advertising server site 40, the function of which is to attract the target subscribers and to facilitate communication between the target client subscriber sites 22a, 22b, 22c . . . and the target information server sites 32a, 32b, 32c . . .

Figure 2:
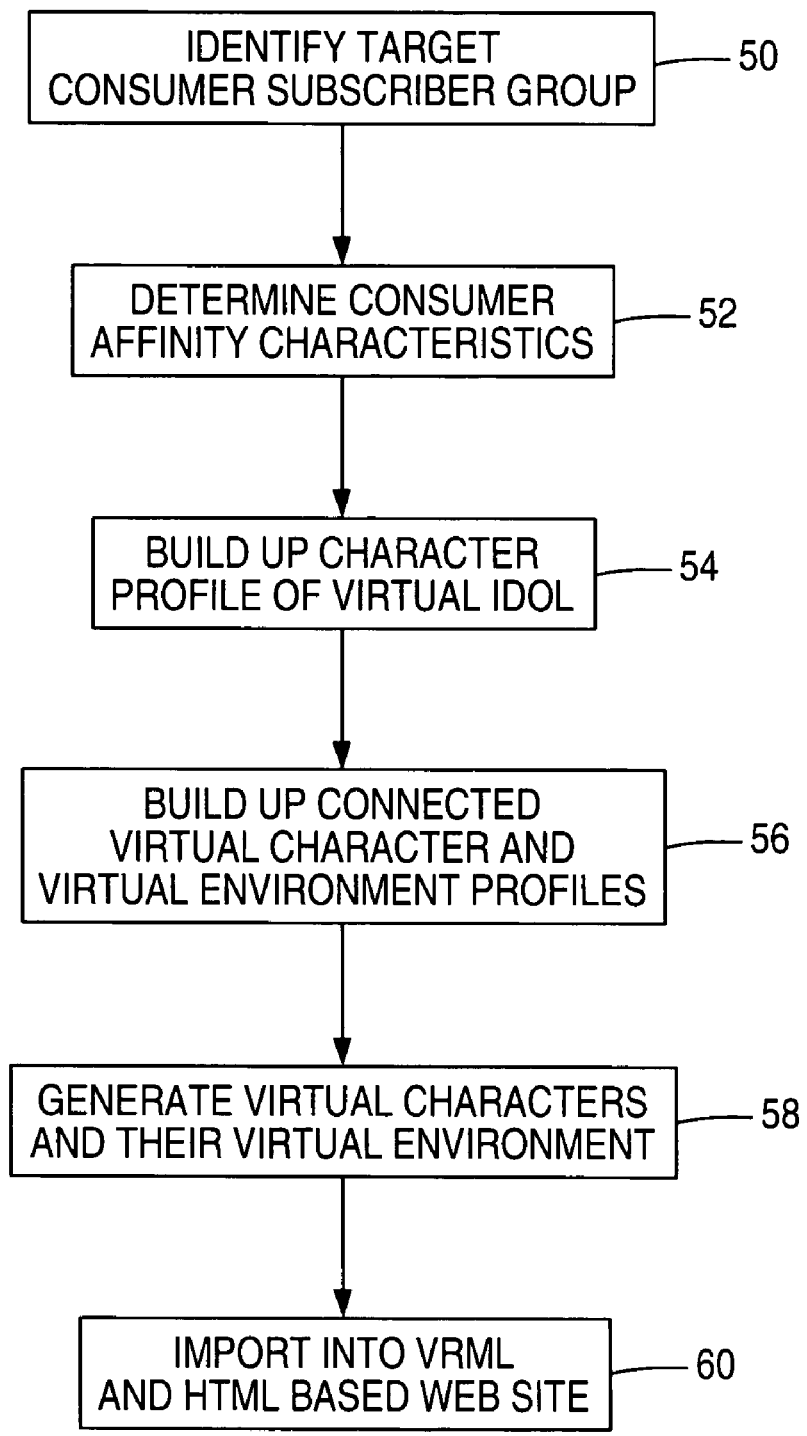
FIG. 2 is a flow diagram representing the generation of a target advertising information web site.

The generation of an interface advertising server site 40 will now be described with reference to the flow diagram in FIG. 2. In Step 50, a target subscriber group is identified. The target subscriber group is a number of consumers having one or more specific common consumer affinity characteristics or attributes. For example, a subscriber group may include a number of people having a certain lifestyle, such as people who buy a certain product (e.g. a brand of clothing or footwear, compact discs of a particular artist or type of music), people who own a car of a particular brand, people who travel abroad to certain destinations or who have certain interests etc. alternatively, a subscriber group may be a number of people who are interested in or who idolize a certain high profile personality or group of personalities such as a popstar band, a sportsperson or a team, actors, models etc. Such a target subscriber group is identified using known market analysis techniques.

In Step 52, the consumer affinity characteristics or attributes of the identified target subscriber group are determined. Consumer affinity characteristics or attributes may be defined as the interests, values and lifestyle aspirations of the consumer segment. For example, on analysis of a target subscriber group which buys a certain brand of footwear, it may be found that the majority of the segment are male, belong to a certain age group, enjoy watching football, eat certain types of food products, listen to certain types of music, watch certain TV programs or films, socialize in certain environments, idolize certain high-profile personalities, have certain moral and political opinions etc. Analysis of the target subscriber group is carried out using known socioeconomic and psychosocial models in order to determine a broad spectrum of consumer affinity characteristics or attributes.

On determination of the consumer affinity characteristics of the identified target subscriber group, a virtual idol character profile is built up based on these consumer affinity characteristics or attributes in Step 54. This character profile combines the most predominant consumer affinity characteristics or attributes of the target subscriber group into a single central character or group of characters (idols). For example, the central character profile built up from the consumer affinity characteristics or attributes of the target subscriber group that bought a certain brand of footwear may include the following information:

| | |
|---|---|
| Sex | Male; |
| Age | 20 Years old; |
| Status | Single; |
| Employment | Full time Sales Assistant |

-continued

| | |
|---|---|
| Salary | $2000 per month |
| Home | One bedroom apartment |
| Status | Cohabiting with Girlfriend |
| Family | Divorced parents |
| | Two Sisters |
| Relationships | Two close male friends |
| Lifestyle | Smoker (cigarette brand, number per day) |
| | Alcohol (brands, no of units) |
| | Music (favorite artists, groups) |
| | Food (eating habits, favorite foods) |
| | Fashion (dress code, fashion brands) |
| | Social life (clubs, bars, restaurants) |

In addition to the central character profile, further connected character profiles and an environment profile are built up in Step 56. The connected character profiles represent other characters who are based around the life of the central character in some way (e.g. partner, friend, colleagues, family etc) and are also determined from the consumer affinity characteristics of the target group. The environmental profile represents the environment in which the central and connected characters exist (e.g. homes, workplaces, shops, restaurants, bars, clubs etc) and is also determined from the consumer affinity characteristics or attributes of the target consumer group.

It should be understood that the aim of building up character and environment profiles in this way is to ensure that the central character and environments match closely with the lifestyle aspirations of the target consumer segment (goes to particular clubs, wears certain fashion brands, has particular interests and attitudes). The life of the central character should match the issues perceived by the target consumer segment as being of real relevance to them (e.g. relationship problems, employment issues, financial problems, etc).

Figure 3A:
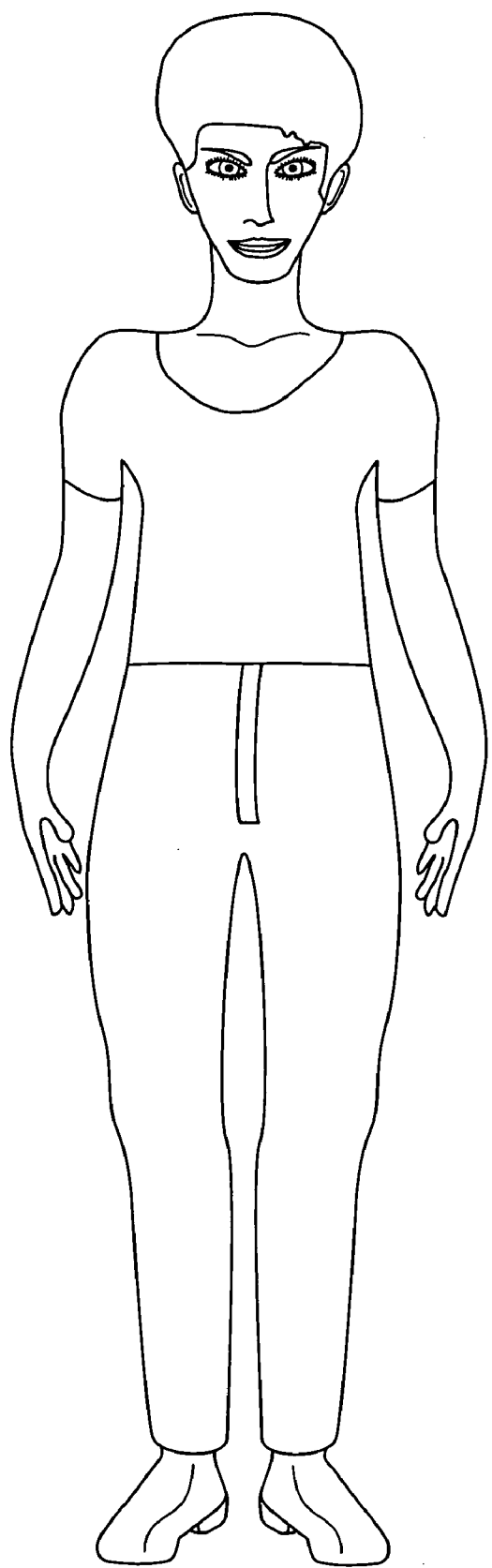
FIGS. 3A and 3B are examples of computer generated characters.
Figure 3B:
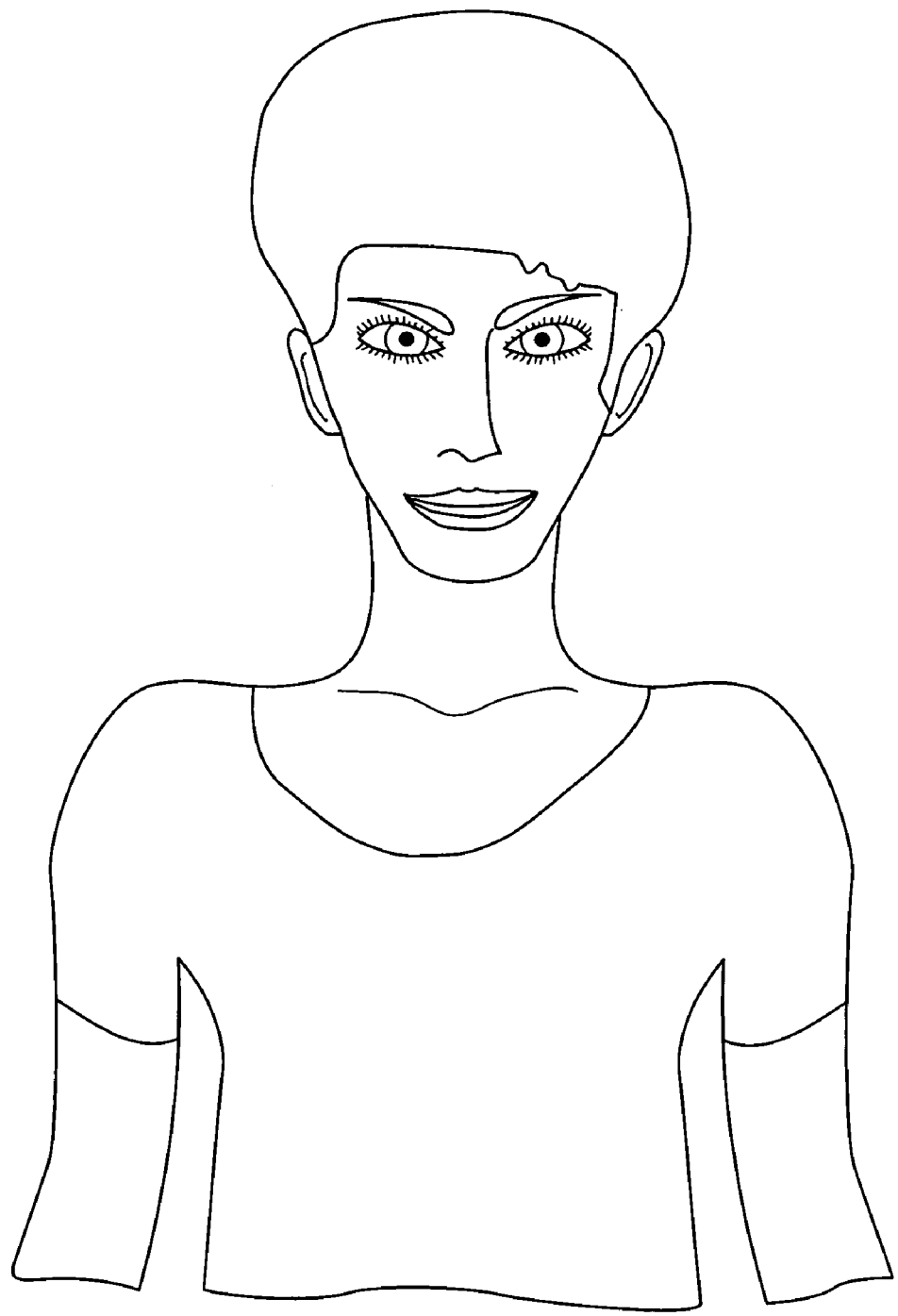

In Step 58, virtual characters are created based on the central character profile and the character profiles of all the other characters in the life of the central character Known anthropomorphic frames and character animation applications (e.g. 3D-Studio Max) are used to create these virtual characters. Skin and texture mapping is also achieved using known techniques (e.g. Adobe Photoshop and Avatar Maker). Examples of computer generated central characters or "virtual idols" are shown in FIGS. 3A and 3B. The virtual characters created are either photo-realistic renderings of a fictitious or actual person or high quality caricatures or a combination of both. A variety of software applications are available in the marketplace which may be used to achieve the same or similar effects.

In Step 60 all the virtual characters and their environment are imported into a Hyper-text Markup Language (HTML) and Virtual Reality Markup Language (VRML) based Website (VRML is a standard signal format for virtual reality applications) which constitutes the interface advertising server site 40. Since all characters and environments are rendered in VRML, interaction of the characters with each other and with different environments is possible. The interface server site 40 also includes HTML frames (preformatted windows) so that different scenes of the central character interacting with other characters or with different environments can be depicted. For example, the central character can be animated to move around in any chosen environment (e.g. a clothes shop, a bookstore, a cafe, a bar etc.). An audio application is also included so that the characters may speak to each other or make statements. Various known Internet audio streaming applications can be used.

The communications network 10 is designed to run any standard Internet browser (e.g. Netscape Navigator/communicator or Microsoft Explorer). An electronic mail facility is also provided so that client subscribers can communicate with the virtual characters at the interface Web site 40. Client subscribers may also speak to the characters themselves.

The Internet uses Uniform Resource Locators (URLs) for specifying objects on the Internet. A URL string denotes both the server site and the particular file or page on that server site. The use of URLs to access specified server sites and pages is well known and will not be described herein. All aspects of the central and other connected characters and the environment in which they live (e.g. clothes worn, shoes worn, places frequented, shops visited etc) are referenced by URL strings (HTML co-ordinates). This means that it is possible to select objects in the virtual world so as to connect to another Web site denoted by the URL string. This Web site constitutes a target information server site 32a, 32b, 32c, ..., the pages of which advertise and carry information about the object selected and/or other similar related objects. The site 32a, 32b, 32c . . . may also be equipped with electronic transaction facilities where an order may be placed for a selected product or service and payment made over the Internet. Any suitable type of on-line purchasing systems may be used and may include known On-Line Analytical Process (OLAP) applications for stock accessibility and transaction processing using Secure Electronic Transactions.

The operation of the communications network 10 will now be described. A user at one of the remote target client subscriber sites 22a, 22b, 22c . . . . can access the interface advertising server site 40 through the Internet WWW communication network. It should be understood that such a user represents a member of the target subscriber group and that this user is likely to be attracted to the interface advertising server site 40 as the central character and environment are likely to appeal to the user. This may be thought of as analogous to a soap opera on television in that the members of the public are attracted to, relate to or develop an affinity for fictitious soap characters and their environment and lifestyles. The central character of the interface advertising server site 40 in effect represents a "virtual idol" or a role model.

The user of the target client site 22a, 22b, 22c . . . accesses the interface advertising server site 40 in the normal way by selecting the appropriate Uniform Resource Locator URL) which denotes both the interface advertising server site 40 and the particular file or page on that server. On accessing the pages of the interface advertising server 40, the user "enters" the virtual world of the central character ("virtual idol" or role model) in a similar manner to viewing a soap opera on television. In this virtual world, the central character interacts with the connected characters and the virtual environment. Each character may be thought of as having a personality and acts out a particular role. The central character (virtual idol) plays the leading role and "acts out" a certain "life", while the connected characters have roles in the life of the central character. Each connected character has its own "life" which is related to that of the central character in some way. The "life" of the central character and those of the connected characters is different each day and develops over time in a similar manner to the lives of real people or fictitious soap opera characters.

Figure 4:
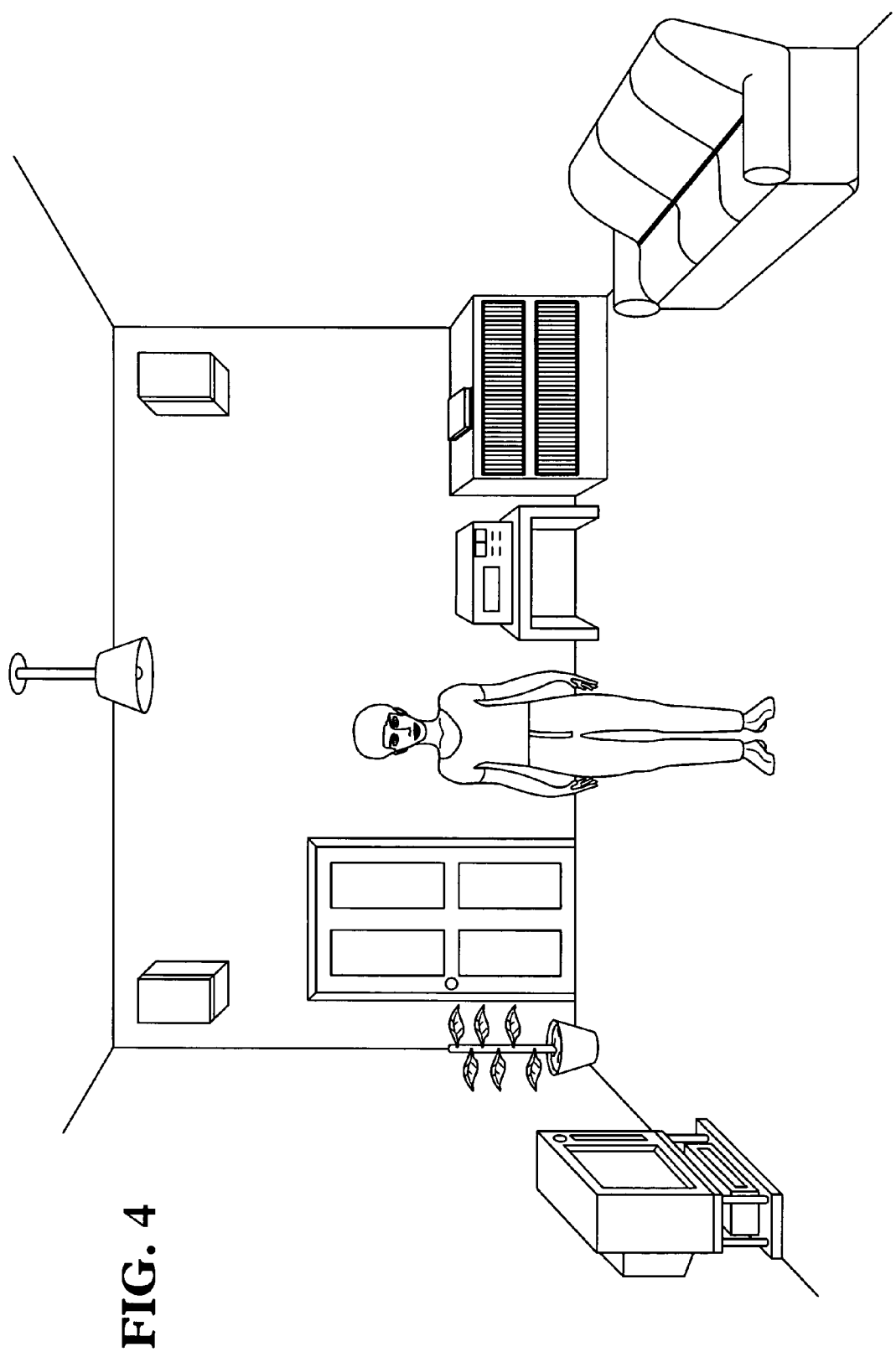
FIG. 4 is an example of a page from the target advertising information web site as accessed by a remote client subscriber.

The interface advertising server site 40 comprises an interactive display of the virtual idol portraying the affinity characteristics or attributes in a role as a consumer of goods and services. A user may communicate with the central character (virtual idol or role model) or other characters by sending them electronic mail in a similar manner to sending fan mail to a soap opera character or a real-life idol. In contrast to viewing a soap opera however, a user may interact with the central or other characters and their environment. For example, as is shown in FIG. 4, if the central character (the "idol") puts on a compact disc to listen to music, a user may select to listen to the compact disc by clicking on the virtual CD player displayed on the display screen at the client site using a mouse device and a sample of the music being listened to by the central character can be heard.

If the user really likes the music and wishes to purchase that compact disc, they may click the compact disc. By clicking on the compact disc, the Web pages described by the URL string associated with the compact disc are accessed by the interface server and the user becomes connected to the target information Web site 32a, 32b, 32c . . . which advertises and provides information about the compact disc and about the artist or group which have made the recording. The user can place an order and pay for the compact disc over the Internet in the known way.

Similarly, by selecting the shoes of the central or other connected characters, connection is made to a target information Web site 32a, 2b, 32c . . . , advertising and providing details of the shoes and other footwear and offering the possibility to purchase such products over the Internet. Restaurants, clubs, bars, theatres, museums and other establishments may also be marketed in the same way. For example, if the central character visits an art gallery one day, the gallery environment or a particular piece of art may be selected by a user. Connection is then made to the appropriate target Web site 32a, 32b, 32c . . . . where further information or publicity is available. Tickets may be purchased or reservations made at this Web site 32a, 32b, 32c. . . .

In this way an interactive communication link is established between the interface advertising 40 and the client subscriber sites 22a, 22b, 22c . . . which provides interactive access from the client subscriber sites 22a, 22b, 22c . . . to the consumer goods and services portrayed in the interactive display.

An effective way is provided of interfacing consumers with information over the Internet about products and services which are likely to be relevant to their lives. At the same time, an effective way is provided for commercial enterprises offering consumer products and services to reach specific target consumer segments and to develop commercial relationships by capturing the attention and affinity of that specific consumer segment to an appropriate "virtual idol" or role model on the Internet. The lifestyle and character of the "virtual idol" are defined by the commercial and lifestyle interests of the target consumer segment. Since the life of the "virtual idol" changes from day to day and develops, the attention and affinity of the target consumer group is maintained.

Moreover, it allows life-style related products and services to be marketed and purchased over the Internet through use or interaction of the "virtual idol" with such products or services (e.g. the idol character that the consumer segment are attracted to wears specific brands of clothes, goes to this or that restaurant, buys x, y, z CDs).

It should be understood that the central character ("virtual idol" or role model) may be a group of characters of equal importance in the virtual world (e.g. a sports team, popgroup or group of friends) rather than a single character.

Figure 5:
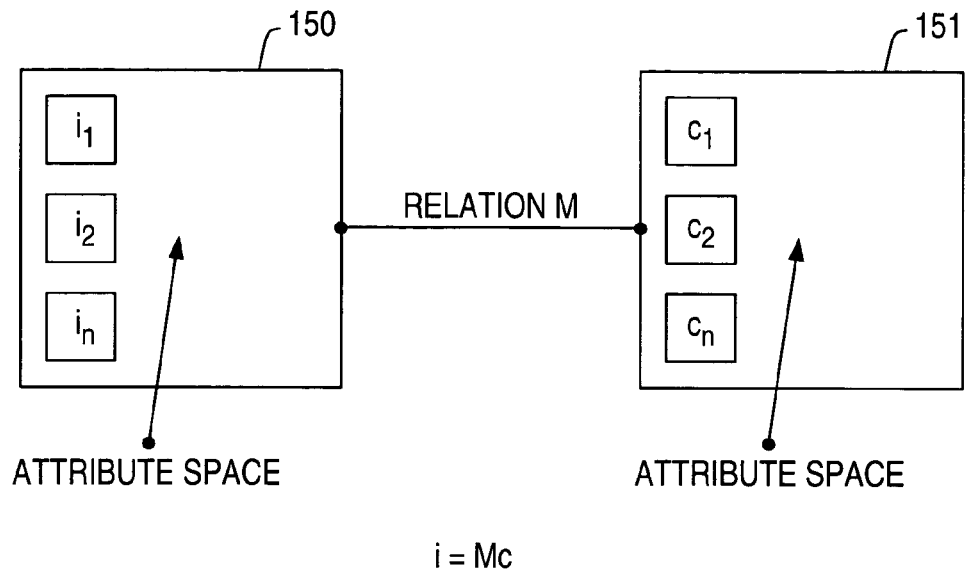
FIG. 5 illustrates the generation of virtual idols having attributes mapped to the attributes of client subscribers.
Figure 5:
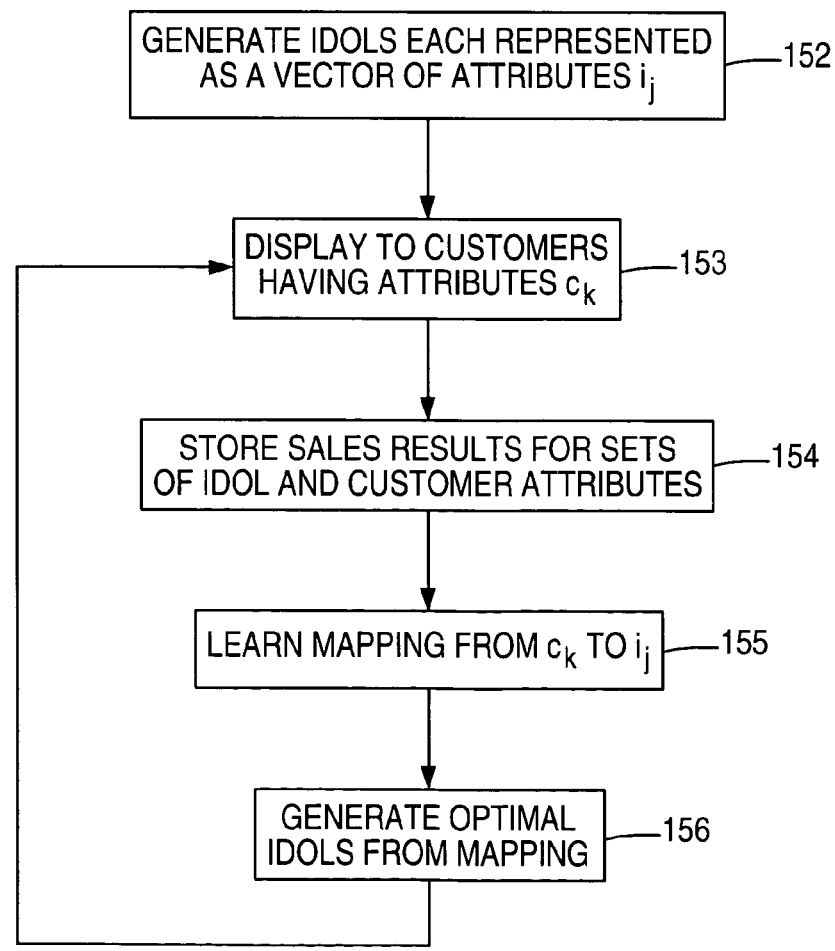

The pages carrying information related to the products and services which may be selected by a user (i.e. the lifestyle related products or services of the central character) may be present at the interface site itself. Hence, other Web sites do not have to be accessed in order to obtain information or to make purchases. Alternatively, a simple database of the products and services available may be down loaded on the interface site from which the appropriate information is retrieved when a user selects an object. In FIG. 5, a number of "virtual idols" or role models are represented in an attribute space 150 using a set of attributes e.g. the physical attributes of sex, size, shape, color, voice quality, and accent and the character attributes of lifestyle aspirations, tastes in music, films and television programs, interests, hobbies, likes and dislikes. The attributes are expressed as a set of numbers for each of the "virtual idols". Some attributes will be represented as real numbers, such as size and age, while other attributes such as sex or musical preferences will be represented as integer values. The attributes of an idol are represented as a vector i containing its collected attributes. Thus in FIG. 5, the attribute space 150 contains the vectors $i_1, i_2, i_3$ ... of corresponding idols. The attributes of a consumer, like those of an idol, can be defined as a vector c containing the collected attributes of the consumer. Thus in FIG. 5, the attribute space 151 contains the vectors $c_1, c_2, c_3$ ... of corresponding consumers in the target consumer segment.

The virtual idol that is presented to a target consumer segment in the manner already described with reference to FIGS. 1 to 4, should be made as appealing to the target consumer segment as possible. The appeal of a "virtual idol" or role model is determined by the propensity of consumers in the target consumer segment to make purchases in response to that "virtual idol" or role model. The propensity to make purchases is defined in the present invention by a marketing function M which maps the attributes of a consumer c to the attributes of an idol i. The marketing function M is defined by equation (1) below;

$$i = M(c) \qquad \text{Equation 1}$$

The best functional form of the marketing function M would depend on the application, but in most cases it would be non-linear. Once a functional form has been decided upon, the parameters of M must be determined empirically.

In FIG. 5, in step 152, a number of idols are generated and the attributes of each are represented by a corresponding vector $i_j$. In step 153, the idols are each displayed to respective consumer segments having attribute vectors $c_k$. The attributes of the different consumer segments are known from previously collected data and are represented as consumer vectors in the attribute space 151 as already explained. The sales results from the sets of idol and consumer attributes are stored in step 154. The sales results are processed in step 155 using standard statistical or artificial intelligence techniques in order to learn the best mapping from the vectors $c_k$ to the vectors $i_j$.

In step 156, the optimal idols ij indicated by the best mapping learned from the step 155 are generated and used in the advertising display to any new customer within the consumer segment having the attributes $c_k$. The iteration of steps 153 to 156 causes the best mapping function M to develop.

Figure 7:
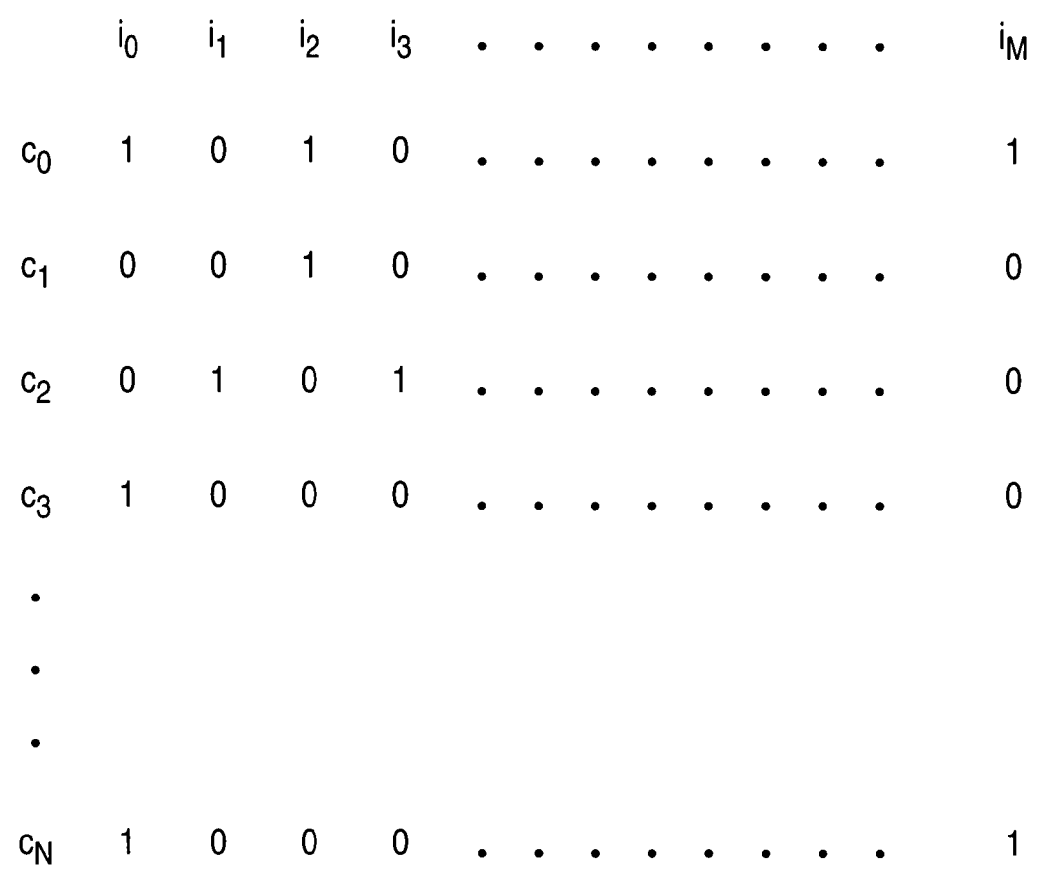

In FIG. 7, the sales results referred to in step 154 of FIG. 5 are illustrated as a matrix of relationships between the vectors ij and the vectors $c_k$. A sale is represented by a 1 and the absence of a sale is represented by a 0.

Figure 6:
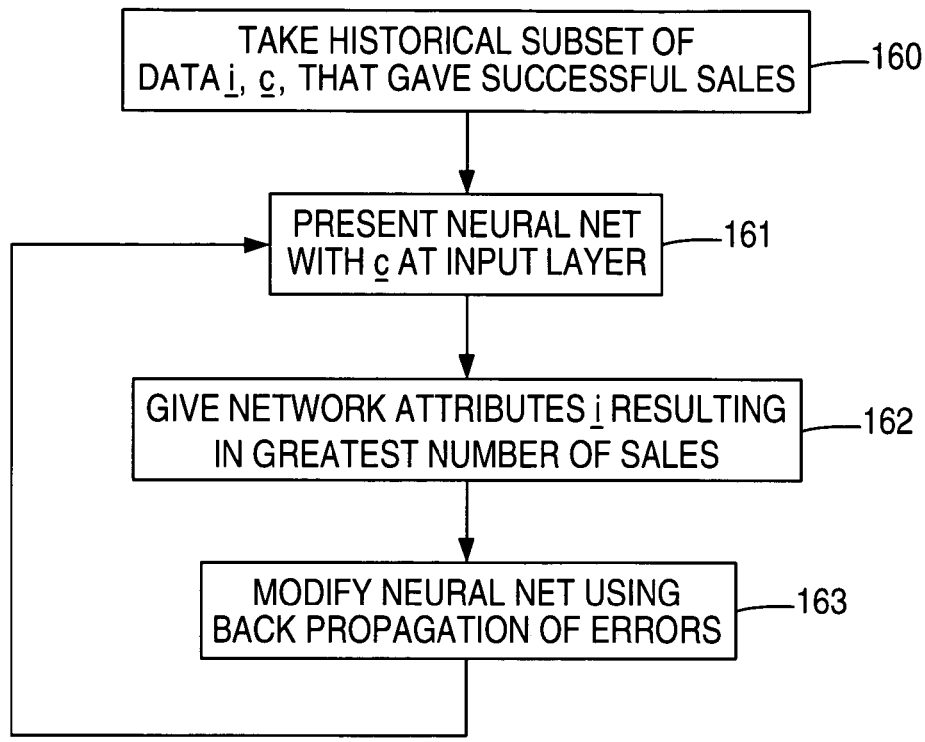
FIG. 6 illustrates the use of a neural net to evolve a mapping function in a step of the process of FIG. 5.
Figure 6:
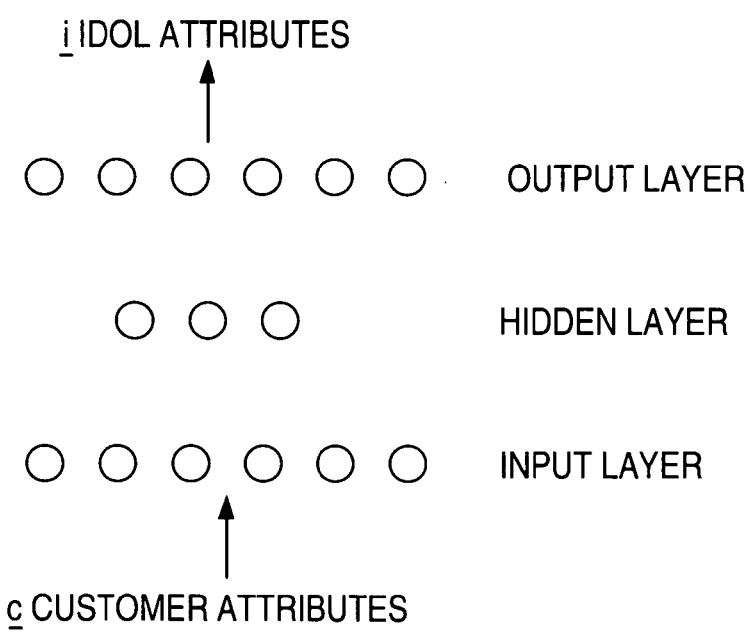

A number of alternative techniques are available to implement the step 155 of FIG. 5 and thereby estimate the optimal marketing function M that maximizes sales. One such technique will now be described by reference to FIG. 6. In FIG. 6, in step 160, the historical sub-set of data i and c that gave rise to successful sales is collected. In step 161, a three layer neural net is presented with the customer attributes c at the input layer as graphically represented at the bottom of FIG. 6. In step 162, the network is presented with the attributes i that result in the greatest number of sales and in step 163 the neural net is modified using back propagation of errors to develop the desired idol attributes i in the output layer of the neural net.

Figure 8:
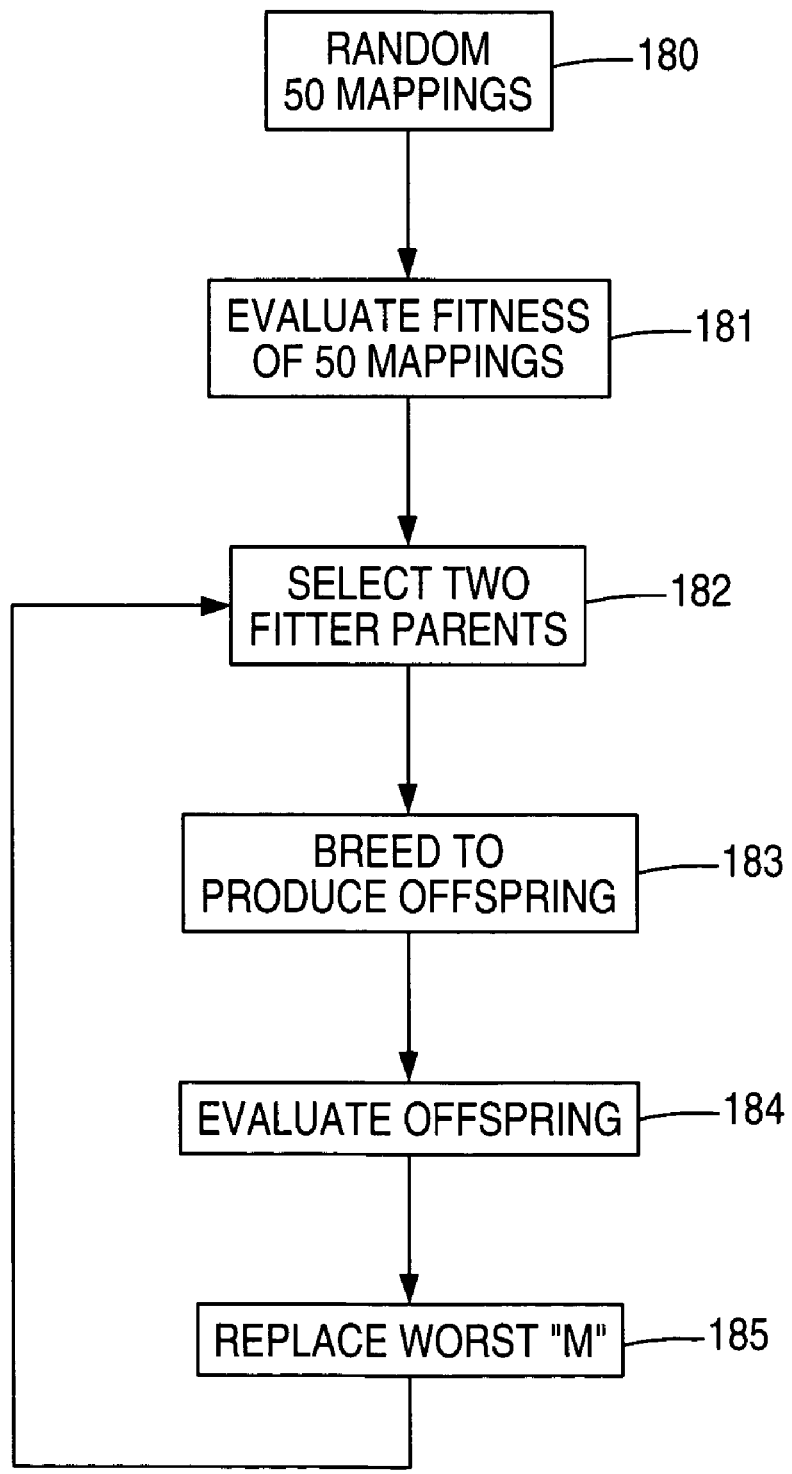
FIG. 8 illustrates the use of a genetic algorithm to evolve a mapping function in a step of the process of FIG. 5.

A second technique for implementing the step 155 of FIG. 5 is to use a genetic algorithm to evolve the mapping function as will now be described with reference to FIG. 8. In FIG. 8, in step 180, a random 50 genomes are entered as an initial data set. Each genome individually models a mapping by means of chromosome data. It will be understood that the number of genomes entered in step 180 may be more or less than 50 and that the number 50 is illustrative only.

The fitness of each of the 50 genomes and consequently the mappings represented by the genomes is evaluated in step 181. The fitness of a mapping is judged by the sales success of that mapping. In step 182, 2 fitter parent genomes are selected based on the sales success of the parents. In step 183, the parents breed and produce offspring genomes which are evaluated in step 184. Those genomes in the data set that represent the worst mappings M are replaced in step 185. Further iterations of steps 182, 183, 184 and 185 selectively generate the best mappings.

Whilst two different alternative methods have been described to implement the step 155 of FIG. 5, the invention is not limited to these two alternatives. An additional alternative within the contemplation of the invention is to treat the marketing function parameters as probability distributions and use Bayesian inference to find the posterior distribution of the parameters based on the empirical evidence of the transaction data. Yet another alternative method within the contemplation of the invention is to use a non-linear (e.g. logistic) regression to map c to i.

The invention has been described in relation to mapping the attributes of customers or consumers c to the attributes of a number of different virtual idols i. The invention contemplates mapping the attributes of customers within a customer segment to a single virtual idol. Thus in the case of a single virtual idol, slightly different attributes of the idol may be presented to different consumers within the consumer segment. The most successful attributes of the virtual idol will come to predominate and the character and "lifestyle" of the virtual idol will evolve in a direction that enhances the sales success of the virtual idol. For example, the age, interests or voice quality and accent of the same individual idol may evolve in a direction that finds greater affinity to the target consumer segment within a particular geographic area.

It will also be apparent, to those skilled in the art, that the invention can be applied in the environment of an open communications network such as the Internet and in the environment of a network to which access is restricted to a particular consumer group such as the group of customers of a particular bank. The bank customers may have access to the communications network by way of self-service terminals provided by the bank or by other facilities provided by the bank each of which performs the function of an interactive customer subscriber site. The bank would have an advertising information server site to supply interactive advertising information including a virtual idol or idols. The virtual idol or idols may be evolved to have regional characters according to the geographical locations in which the idol or idols are displayed. In the case where the bank customer has to enter a card or other personal identification, the virtual idol displayed to that customer can be selected from a library of virtual idols according to the attributes of the customer.

What has been described is a method and apparatus for advertising over a communications network comprising a plurality of interactive customer subscriber sites interconnected with an advertising information server site. The attributes of a plurality of customers are stored in the form of customer attribute vectors c and the attributes of one or more role models are stored in the form of one or more role model attribute vectors i. A marketing function M maps the customer attribute vectors to the or each role model attribute vector such that $$i=M(c),$$

and the marketing function M is evolved in dependence upon customer purchases.

What is claimed is:

1. A computerized method, comprising:
   a) identifying a target group of persons;
   b) identifying attributes of persons in the target group;
   c) representing attributes in consumer vectors, one vector per person, thereby producing a plurality of consumer vectors; and
   d) selecting at least some of the consumer vectors and, for each, generating by a computer an animated anthropomorphic idol which displays the attributes of the selected consumer vector.

2. Method according to claim 1, and further comprising:
   e) selecting some of the idols; and
   f) displaying the selected idols on one or more web sites, which are available to consumers.

3. Method according to claim 2, wherein the consumers include consumers in the target group.

4. Method according to claim 2, and further comprising:
   g) offering merchandise for sale at web sites displaying idols; and
   h) measuring and recording success, if any, of each idol in promoting sales.

5. Method according to claim 4, wherein attributes of each idol are represented by a respective idol vector, one idol vector for each idol, and further comprising:
   j) generating an P x Q matrix of information,
   i) which contains P rows of idol vectors and Q columns of consumer vectors;
   ii) which contains P x Q information cells;
   iii) which contains information in each cell indicating whether the customer associated with the customer vector for that cell made a purchase from a web site containing an idol associated with the idol vector for that cell.

6. A computerized method, comprising:
   a) generating a plurality of vectors, one for each of multiple consumers in a sample, each vector describing attributes of the respective consumer;
   b) for selected vectors, generating by a computer an animated anthropomorphic idol for each;
   c) using the idols in marketing activities; and
   d) measuring marketing success of each idol.

7. Method according to claim 6, and further comprising:
   e) designating idols having higher marketing success than others as successful idols.

8. Method according to claim 7, and further comprising:
   f) presenting successful idols in marketing activities to a group of consumers having the same consumer vectors as those of the sample.

9. Method according to claim 6, wherein each idol is associated with an idol vector which describes the idol's attributes, and further comprising:
   e) utilizing statistical or artificial intelligence techniques to ascertain best mapping of consumer vectors to idol vectors.

10. Method according to claim 9, wherein the best mapping indicates which idols should be selected in marketing to persons having consumer vectors identical to a group of consumer vectors selected from the sample.

11. Method according to claim 6, wherein the marketing activity comprises presenting the idols at web sites, which consumers can visit.

12. Method according to claim 11, and further comprising offering merchandise for sale at the web sites.

13. A computerized method, comprising:
   a) identifying a target group of consumers;
   b) for individuals in the group, identifying attributes of each and representing the attributes as consumer vectors, thereby producing one vector per individual;
   c) for selected consumer vectors, generating by a computer an animated anthropomorphic idol for each, the idol having an associated idol vector describing the idol's attributes, thereby producing a group of idols, each having an idol vector;
   d) presenting idols on web sites, together with merchandise available for sale, and taking orders for the merchandise from consumers, including consumers in the target group;
   e) generating a mapping of information which indicates, for each consumer vector, which idol vectors resulted in successful sales;
   f) ascertaining a mapping of the vectors which indicates which idols should be used for marketing activities to a sub-group of consumers, having consumer vectors identical to vectors selected from the target group.

* * * * *